United States Patent [19]

Toyoda

[11] 3,946,409

[45] Mar. 23, 1976

[54] MOTOR DRIVE SYSTEM FOR CAMERA

[75] Inventor: Kenji Toyoda, Tokyo, Japan

[73] Assignee: Nippon Kogaku K.K., Tokyo, Japan

[22] Filed: Sept. 7, 1973

[21] Appl. No.: 395,181

[30] Foreign Application Priority Data

Sept. 20, 1972 Japan................................. 47-93680
Sept. 20, 1972 Japan................................. 47-93681

[52] U.S. Cl.................. 354/173; 354/171; 354/206
[51] Int. Cl.²........................................ G03B 1/12
[58] Field of Search ...... 95/31 El, 31 AC; 242/71.4, 242/71.5, 71.6; 354/171, 173, 206

[56] References Cited
UNITED STATES PATENTS

| | | | |
|---|---|---|---|
| 3,448,669 | 6/1969 | Suzuki | 95/31 EL |
| 3,598,034 | 8/1971 | Suzuki | 95/31 EL |
| 3,613,542 | 10/1971 | Wiessner et al. | 354/171 |
| 3,688,669 | 9/1972 | Ogiso et al. | 354/171 |
| 3,710,705 | 1/1973 | Kimura | 354/171 |
| 3,800,310 | 3/1974 | Umeda | 354/171 |

*Primary Examiner*—L. T. Hix
*Assistant Examiner*—Russell E. Adams, Jr.
*Attorney, Agent, or Firm*—Shapiro and Shapiro

[57] ABSTRACT

A motor drive system for a camera, including a reversible motor, means for transmitting the revolutions of the motor to a film advance and shutter charge shaft, a control circuit for selecting the operating condition of the motor including forward revolution, reverse revolution and stop, means for delivering a film advance start signal to the control circuit, and torque detector means for detecting a torque applied to the rotary shaft of the motor indicating completion of the film advance, the control circuit being responsive to the torque detector means to initiate reverse revolution of the motor. The control circuit includes at least one flip-flop circuit, a gate circuit having an input coupled to an output of the flip-flop circuit, and two relays connected with the output terminals of the gate circuit and the flip-flop circuit to control the motor. There is further provided a switch which is responsive to the rotation of the film advance and shutter charge shaft to open when the shaft is in a predetermined position and close in all other positions of the shaft. The switch de-energizes the motor when the operation cycles are completed.

9 Claims, 13 Drawing Figures

MOTOR DRIVE SYSTEM FOR CAMERA

BACKGROUND OF THE INVENTION

1. Field of the Invention

This invention relates to a motor drive system for cameras of the type which include a shutter requiring reciprocative movement of a shutter charge member.

2. Description of the Prior Art

There are known in the art two types of devices for effecting shutter charge in cameras. In the first type of device the shutter charge member is operable in response to a film advance lever to move in one direction until it stops at a certain position. In the second type of device the shutter charge member is operable in response to a film advance lever to move in one direction for shutter charge and then move back in the opposite direction to return to its initial position.

The second type of the device has the advantage of simple construction because the shutter mechanism portion and the film advance system are readily separable from each other. Consequently the shutter mechanism portion can be produced and supplied as a unit separate from the other mechanisms. On the other hand, this type of device suffers from a significant disadvantage. Should shutter release occur before the shutter charge member has completely returned to its initial position, the movement of the shutter mechanism would be interrupted by the charge member thereby causing a great error in exposure time, and possibly resulting in failure of the device. To avoid this, cameras provided with such a reciprocating shutter charge member have been designed such that the charge lever reciprocates in response to movement of the film advance lever, and such that shutter release cannot occur until the film advance lever has completely returned to its initial position. However, development of a simple, reliable motor drive system suitable to be utilized in such cameras has been difficult because of the complexity of the operation cycles. A motor drive system for use with a camera having the first type of shutter charging device involves only two cycles of operation, i.e. rotating a film advance and shutter charge shaft in one direction to effect film advance and shutter charge and thereafter releasing the shutter, whereas in the case of a device of the second type there are involved three cycles of operation, that is, rotating the film advance and shutter charge shaft in one direction to effect film advance and shutter charge, then rotating the shaft in the opposite direction to return the advance lever and shutter charge member to their initial positions (this intermediate cycle being hereinafter referred to as "resetting" or the "lever return cycle"), and thereafter releasing the shutter.

SUMMARY OF THE INVENTION

It is an object of the present invention to provide a motor drive system for cameras using the above-mentioned second type of shutter charge device in which a film advance motor is also utilized for the lever return cycle and which is simple and compact in construction.

In one embodiment of the present invention, the motor drive system for a camera comprises a reversible electric motor, means for transmitting the revolutions of the motor to a film advance and shutter charge shaft in the camera, a control circuit for selecting one of three operating conditions of the motor including forward revolution, reverse revolution and stop, means for delivering a film advance start signal to the control circuit, and torque detector means for detecting a torque applied to the rotary shaft of the motor, the control circuit being responsive to the torque detector means to initiate reverse revolution of the motor. The control circuit includes a flip-flop circuit, a gate circuit having as one of its inputs an output of the flip-flop circuit, and two relays connected with the output terminals of the gate circuit and the flip-flop circuit to control the motor. The apparatus of the invention further includes a switch responsive to the position of the film advance and shutter charge shaft to be open when the shaft assumes a predetermined position and to be closed for all other positions of the shaft. The film advance start signal causes forward revolution of the motor to thereby effect film advance and shutter charge. Thereafter, when the film advance is completed (i.e. the motor is unable to cause further movement of the film), the torque detector means detects a sharply increased torque applied to the rotary shaft of the motor and consequently reverses the revolution of the motor to return the film advance and shutter charge shaft to its original position. Thereupon, the switch opens and stops the motor.

In another embodiment of the present invention, the motor drive system comprises a reversible electric motor, means for transmitting the revolutions of the motor to a film advance and shutter charge shaft in the camera, a control circuit for selecting one of three operating conditions of the motor including forward revolution, reverse revolution and stop, and a normally-open push-button switch adapted to close only when a push button is depressed, and torque detector means for detecting a torque applied to the rotary shaft of the motor, the control circuit being responsive to the torque detector means to initiate reverse revolution of the motor. The control circuit includes at least one flip-flop circuit, a gate circuit having as one of its inputs an output of the flip-flop circuit, and two relays connected with the output terminals of the gate circuit and the flip-flop circuit to control the motor. As in the first embodiment, a switch is provided which is responsive to the rotation of the film advance and shutter charge shaft to be open when the shaft assumes a predetermined position and to be closed for the other positions of the shaft. However, in this embodiment, depression of the push button causes reverse revolution of the motor for thereby effecting shutter release. During the shutter release, the motor is stopped in response to a shutter opening-closing signal. After the shutter release, the motor is caused to effect forward revolution for thereby effecting film advance and shutter charge. Thereafter, when the film advance is completed, the torque detector means detects a sharply increased torque applied to the rotary shaft of the motor and consequently reverses the revolution of the motor to return the film advance and shutter charge shaft to its original position, at which time the last-named switch is opened to stop the motor.

The construction and operation of the invention will become more fully apparent from the following detailed description of several embodiments thereof taken in conjunction with the accompanying drawings.

BRIEF DESCRIPTION OF THE DRAWINGS

FIGS. 2a, b, and c illustrate the operation of the mechanism shown in FIG. 1.

DESCRIPTION OF THE PREFERRED EMBODIMENTS

A first embodiment of the present invention will be described with reference to FIGS. 1, 2 and 3.

Figures 1, 4:
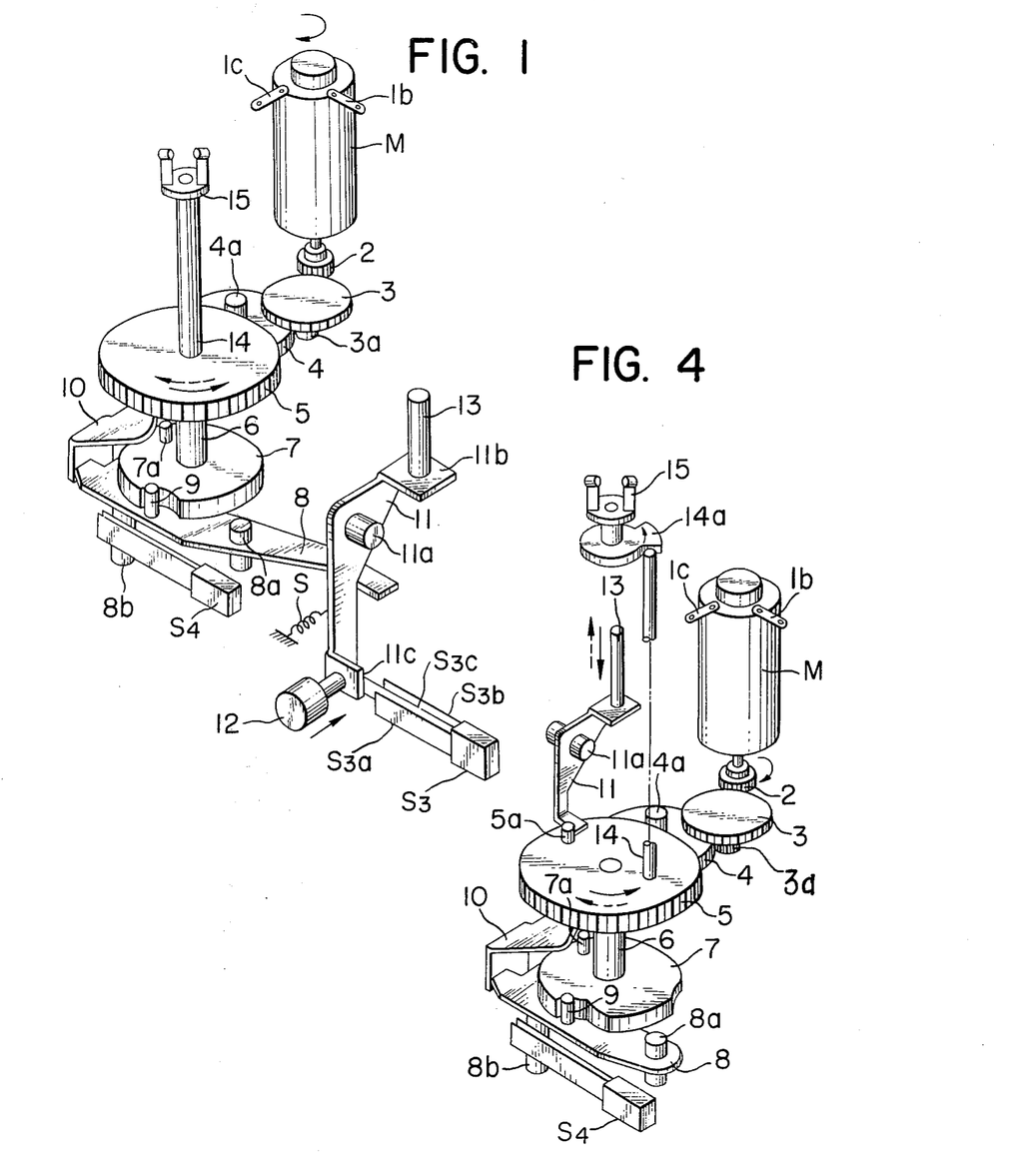
FIG. 1 is a perspective view showing a mechanism employed in a first embodiment of the present invention.
FIG. 4 is a perspective view showing a mechanism employed in a second embodiment of the present invention.

Referring to FIG. 1, a reversible motor M has a positive terminal 1b and a negative terminal 1c. The motor M is designed such that it effects forward (clockwise) revolution upon a flow of current from the positive terminal 1b to the negative terminal 1c and effects reverse (counter-clockwise) revolution upon a flow of current from the negative terminal 1c to the positive terminal 1b. A gear 2 is securely mounted on the shaft of the motor M. Gears 2, 3, 3a, 4, 4a and 5 are arranged to provide a reduction gear train. A shaft 6 is integrally formed with gear 5 and cam 7. The cam 7 has a pin 7a secured thereto and adapted to release a retaining lever 10. The retaining lever 10 is biased for counter-clockwise rotation by a spring 10a shown in FIG. 2a. A switch lever 8 has a pin 9 secured thereto which is in engagement with the cam 7. The switch lever 8 is pivotable about a pivot 8a in response to rotation of the cam 7. The switch lever 8 also has a pin 8b secured thereto to open and close a switch S4. The relationship between the pin 8b and the switch S4 will be described further hereinbelow. A shutter release lever 11 engages one end of the switch lever 8 and is adapted to be rotated in a counter-clockwise direction about a pivot 11a upon depression of a push button 12. The shutter release lever 11 is biased clockwise by a spring S, with one end 11b thereof engaged by a shutter release plunger 13 and the other end 11c engaged by a push button switch S3. The push button switch S3 is a double throw switch with a movable contact S3c and two fixed contacts S3a and S3b, of which the contacts S3a and S3c are normally closed. Depression of the push button 12 in the direction of the arrow will impart counter-clockwise rotation to the shutter release lever 11, causing end 11b of the lever 11 to actuate the plunger 13 for releasing the shutter (not shown) in the camera body and causing end 11c of lever 11 to close contacts S3c and S3b. Simultaneously, the switch lever 8, engaged by the shutter release lever 11, will be rotated in a counter-clockwise direction, thereby closing switch S4. A drive shaft 14 extends upwardly from the gear 5 and has a film advance coupling 15 for engagement with a film advance and shutter charge shaft (not shown) in the camera body.

Figure 3:
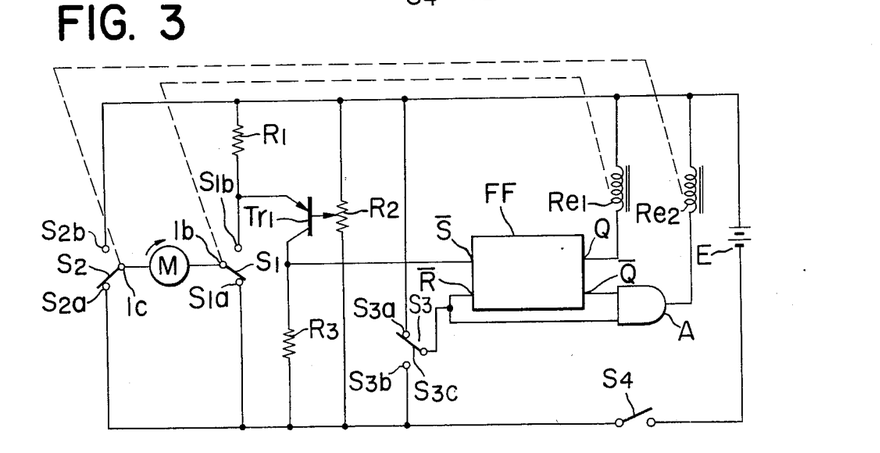
FIG. 3 is a diagram of an electric circuit employed in the first embodiment of the present invention.

Referring to FIG. 3, the letter E designates an electrical power source. Switch S3 is the aforementioned push-button switch having two fixed contacts S3a and S3b and movable contact S3c shiftable therebetween in response to the shutter release lever 11. FF is a conventional R-S flip-flop circuit having input terminals $\overline{S}$, $\overline{R}$ and output terminals Q, $\overline{Q}$. An AND gate circuit A has its inputs connected to input terminal $\overline{R}$ and output terminal $\overline{Q}$ of the R-S flip-flop circuit. The input terminal $\overline{R}$ of the R-S flip-flop circuit FF is connected with contact S3c of the push-button switch S3. Relays Re1 and Re2 are connected with and controlled by the output terminal Q of the R-S flip-flop and the output terminal of the AND gate A, respectively. The positive terminal 1b and the negative terminal 1c of the motor M are connected with the contact S1 of the relay Re1 and the contact S2 of the relay Re2, respectively. When energized, the relays Re1 and Re2 have their contacts S1 and S2 connected with switch contacts S1b and S2b so that the motor M is effectively short-circuited through resistor R1 and de-energized. When only the relay Re1 is energized, the contact S1 thereof is connected with the contact S1b, but the contact S2 remains connected with S2a to thereby permit a flow of current in the direction from the positive terminal of the power source E through the positive terminal 1b of the motor M to the negative terminal 1c of the motor M and further to the negative terminal of the power source E, thus causing forward revolution of the motor M. When only the relay Re2 is energized, the contact S2 is connected with S2b, but the contact S1 remains connected with S1a to thereby permit a flow of current in the direction from the positive terminal of the power source E through the negative terminal 1c of the motor M to the positive terminal 1b of the motor M and further to the negative terminal of the power source E, thus causing reverse revolution of the motor M. When neither of the relays Re1 and Re2 is energized, the motor M is of course de-energized.

Fixed resistors R1, R3, potentiometer R2 and pnp transistor Tr1 together constitute a torque detector circuit for motor M. When the load torque applied to the motor M exceeds a predetermined value, thereby causing the current flowing through the fixed resistor R1 to exceed a predetermined value, the pnp transistor Tr1 becomes nonconductive and the potential at the input terminal $\overline{S}$ of the R-S flip-flop circuit changes from a high level to a low level. The potentiometer R2 is adjustable for the purpose of preventing the torque detector circuit from being inaccurately operated due to irregularities of the characteristics of the motor M and pnp transistor Tr1. Switch S4 is closed by the switch lever 8 upon depression of the push button 12 and serves as a power switch.

In operation, the push button 12 is first depressed in the direction of the arrow (FIG. 1). This causes counter-clockwise rotation of the shutter release lever 11 which in turn lifts the shutter release plunger 13 to release the shutter. Simultaneously, the movable contact S3c of the push-button switch S3 shifts from the contact S3a to the contact S3b. At the same time, switch lever 8 is rotated in a counter-clockwise direction about the pivot 8a as a result of the rotation of the shutter release lever 11, thereby closing the power switch S4 (see the position of FIG. 2a). When power is supplied from the power source to the R-S flip-flop circuit FF and to the torque detector circuit, a current flows through the fixed resistor R1 and the potentiometer R2 to the base of the pnp transistor Tr1, which is thereby rendered conductive and increases the potential at the input terminal $\overline{S}$ of the R-S flip-flop circuit FF to a high level. To the other input terminal $\overline{R}$ of the flip-flop FF is applied a negative voltage from the power source E, through closed contacts S3c and S3b of switch S3, to cause a low level of potential thereat, with the output terminals Q and $\bar{Q}$ providing a low level and a high level of potential, respectively. Further, because AND gate circuit A has its inputs coupled to the input terminal $\bar{R}$ (low level) and the output terminal $\bar{Q}$ (high level) of the R-S flip-flop, the potential at the output terminal of gate A is reduced to a low level. Thus, a current flows to energize the relays Re1 and Re2, the respective contacts S1 and S2 of which are shifted into engagement with the contacts S1b and S2b, respectively, thus short-circuiting and accordingly de-energizing the motor M. Concurrently the shutter is opened (by release lever 11) to expose the film, and after a predetermined time of exposure, the shutter is closed to complete the photographic process. Subsequently, the push button 12 is released to return the shutter release lever 11 to its original position, whereby the switch contact S3c is returned from contact S3b to S3a.

Figures 2A, 2B, 2C:
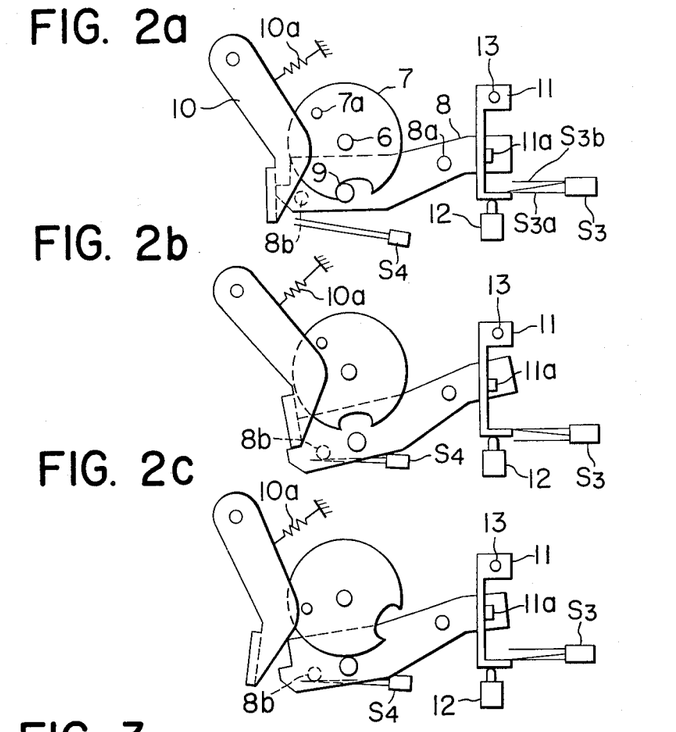

When the push button 12 was depressed initially, the retaining lever 10 was turned counter-clockwise by spring 10a from the position of FIG. 2a and the end of the retaining lever 10 entered a cut-away of the switch lever 8, as shown in FIG. 2b, to maintain this lever in a retained position independent of the position of push button 12 and lever 11, thus maintaining the power switch S4 closed when the push button is released. Since the push-button switch contact S3c is returned to the contact S3a when the push button is released, the input terminals $\bar{R}$ and $\bar{S}$ of the R-S flip-flop circuit FF are both at a high level of potential, and thus the output terminals Q and $\bar{Q}$ still remain at a low and a high level of potential, respectively. In the AND gate circuit A, the two input terminals assume a high level of potential and the output terminal also assumes a high level of potential. As a result, the relay Re2 is de-energized. Since the other relay, Re1, remains energized, a current flows through the motor M from its positive terminal 1b to its negative terminal 1c, whereby the motor startss its forward revolution. As the motor thus starts its forward revolution, the gear 5 in the reduction gear train is rotated in the direction of the solid-line arrow (FIG. 1, also turning cam 7 in that direction, as will be described more fully later. This rotates the film advance coupling 15, which in turn rotates the film advance and shutter charge shaft in the camera body to thereby effect film advance and shutter charge.

Upon completion of the film advance and shutter charge, the film advance and shutter charge shaft in the camera body is mechanically unable to rotate further. Consequently the torque imparted to the film advance coupling 15 is sharply increased, causing an increase in the current through resistor R1. This increases the voltage drop provided by the fixed resistor R1, which forms part of the torque detector circuit for motor M, thus truning off the pnp transistor Tr1. As a result, the potential at the input terminal $\bar{S}$ of the R-S filp-flop circuit FF is reduced to a low level. However, the potential at the other input terminal $\bar{R}$ remains at a high level. Thus, the potentials at the output terminals Q and $\bar{Q}$ attain a high level and a low level, respectively. Moreover, the output terminal of the AND gate circuit A, which has its input terminals at low and high levels, is at a low level of potential. Thus, the relay Re2 is energized and the relay Re1 is de-energized, causing their respective contacts S2 and S1 to shift to contacts S2b and S1a, thereby permitting a flow of current from the negative terminal 1c to the positive terminal 1b of the motor M, which thus starts reverse revolution.

During forward revolution, the cam 7 was rotated in the direction of the solid-line arrow of FIG. 1 from the position of FIG. 2b, and the pin 7a which is secured to the cam 7 was brought into engagement with the retaining lever 10 to turn the retaining lever clockwise and thus to release the switch lever 8 from retention by the lever 10 as shown in FIG. 2c. However, because the periphery of cam 7 was engaged by the pin 9 during forward revolution, as shown in FIG. 2c, switch lever 8 remained in its previous (retained) position, and the power switch S4 remained closed.

During reverse revolution, gear 5 and shaft 14 rotate in the direction of the broken-line arrow of FIG. 1, and the shutter charge member (not shown) returns to its original position. Because of a conventional one-way coupling the film is not affected by reverse rotation of shaft 14. As the pin 9 becomes engaged in the recess of the cam 7, the power switch S4 opens (see the position of FIG. 2a ). This opening of the power switch S4 cuts off the power supply to the R-S flip-flop FF and to the torque detector circuit, whereupon the motor M is de-energized and stops rotating.

In the above-described first embodiment of the present invention, the torque detector circuit is constituted by resistors R1, R2, R3 and transistor Tr1, but it will be apparent to anybody skilled in the art that the same result may be achieved by an alternative arrangement in which a torque detector takes the form of a mechanical means (e.g., a switch adapted to open or close in response to a cam upon completion of film advance) for detecting the instant at which the film advance and shutter charge shaft has completed the film winding. The output of the switch would, of course, be connected with the input terminal $\bar{S}$ of the R-S flip-flop circuit FF in the manner described above.

The above-described embodiment of the present invention provides a simple motor drive system for cameras of the type which uses a shutter requiring reciprocation of a shutter charge member. Moreover, because most of the system is electrical, integrated circuits and the like may be employed, thereby permitting great reduction in the size of the system.

A second embodiment of the present invention will now be described by reference to FIGS. 4, 5 and 6.

Figure 5A:
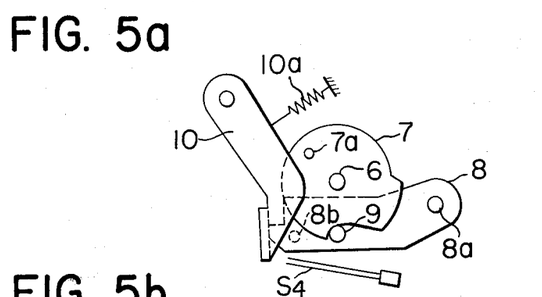
FIGS. 5a, b, c and d illustrate the operation of the mechanism shown in FIG. 4.

In FIG. 4, M designates a reversible motor having a positive terminal 1b and a negative terminal 1c. The motor M is designed such that it effects forward revolution (in the direction of the arrow at gear 2) upon a flow of current from the positive terminal 1b to the negative terminal 1c and effects reverse revolution (in the opposite direction to the arrow) upon a flow of current from the negative terminal 1c to the positive terminal 1b. Gear 2 securely mounted on the rotary shaft of the motor M and gears 3, 3a, 4, 4a and 5 together constitute a reduction gear train. Reverse revolution of the motor M will cause a shutter release lever 11 to be pivoted upwardly by a pin 5a fixed to the gear 5. The lever 11 engages a shutter release plunger 13 by which shutter release is effected. More specifically, the design is such that when the plunger is moved in the direction of the broken-line arrow at plunger 13, it pushes up a release member in the camera body (not shown) to thereby release the shutter. A drive pin 14 secured to the gear 5 is in engagement with a drive cam 14a integrally formed with a film advance coupling 15 for engagement with a film advance and shutter charge shaft (not shown) in the camera body. A cam 7 is integrally formed with the gear 5 and shaft 6. A pin 7a secured to the cam 7 is arranged to release a retaining lever 10. The retaining lever 10 is biased clockwise by a spring 10a (shown in FIG. 5). A switch lever 8 has a pin 9 secured thereto, the pin 9 being a follower member. The cam 7 and the pin 9 are in contact with each other (by virtue of a spring [not shown] urging lever 8 clockwise) and the switch lever 8 is pivotable about a pivot 8a in response to movement of the cam. The switch lever 8 also has a pin 8b secured thereto for opening and closing a power switch S4. The relationship between the pin 8b and the power switch S4 will be described further hereinbelow.

Figure 6:
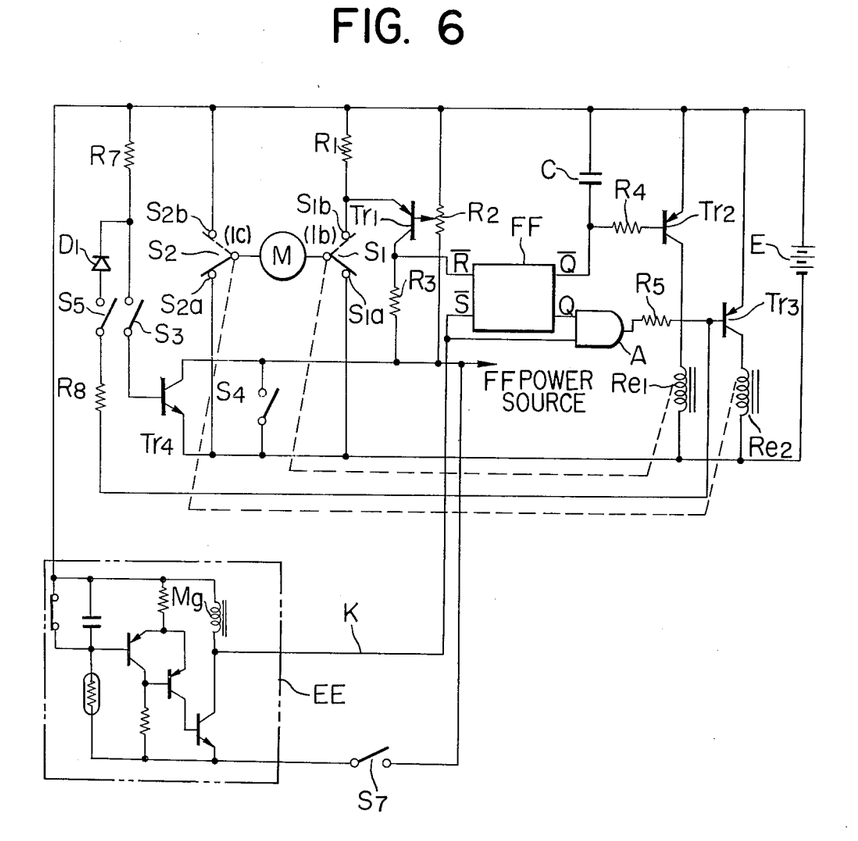
FIG. 6 is a diagram of an electric circuit employed in the second embodiment of the present invention.

Referring now to FIG. 6, the reference numeral E designates an electrical power source; S5 is a mode selection switch for selecting either a single-frame shot or continuous shots (hereinafter referred to as "S-C mode selection switch"). Opening of this switch permits continuous shots and closing of this switch permits single-frame shots. In this figure C designates a capacitor, and FF a conventional R-S flip-flop circuit having input terminals $\bar{R}$, $\bar{S}$ and output terminals Q, $\bar{Q}$. The capacitor C is necessary to ensure that at the time the flip-flop circuit FF is initially supplied with power from the source E, the output terminal $\bar{Q}$ of the flip-flop FF will provide a high level of potential and the other output terminal Q will provide a low level of potential. An AND gate circuit, designated by A, has its input terminals coupled to the input terminal $\bar{S}$ and the output terminal Q of the R-S flip-flop FF. Tr2 and Tr3 designate pnp transistors. The base of the transistor Tr2 is connected to the output terminal $\bar{Q}$ of the R-S flip-flop circuit FF through a fixed resistor R4, and the base of the transistor Tr3 is connected to the output terminal of the AND gate circuit A through a fixed resistor R5. Relays Re1 and Re2 are controlled by the pnp transistors Tr2 and Tr3. The positive terminal 1b and the negative terminal 1c of the motor M are connected with the movable contact S1 of the relay Re1 and the movable contact S2 of the relay Re2, respectively.

When both transistors Tr2 and Tr3 are in an OFF state, the relays Re1 and Re2 are both de-energized and therefore connect their contacts S1 and S2 with S1a and S2a, respectively, thus short-circuiting and de-energizing the motor M. When only the transistor Tr2 is in an ON state, the relay Re1 alone is energized to connect the contact S1 with S1b but the contact S2 remains still connected with S2a as before. Thus, a current flows from the positive terminal of the power source E through fixed resistor R1, the positive terminal 1b of the motor M, and the negative terminal 1c of the motor M, to the negative terminal of the power source E, whereby the motor M effects forward revolution. When only the transistor Tr3 is in an ON state, the relay Re2 alone is energized to connect the contact S2 with S2b but the other relay contact S1 remains connected with S1a, so that a current flows from the positive terminal of the power source E, through the negative terminal 1c of the motor M and the positive terminal 1b of the motor M, to the negative terminal of the power source E, whereby the motor M effects reverse revolution.

When both transistors Re2 andd Tr3 are in an ON state, both relays Re1 and Re2 are energized to thereby connect their contacts S1 and S2 with S1b and S2b, respectively, so that the motor M is effectively short-circuited through the fixed resistor R1. The fixed resistors R1 and R3, pnp transistor Tr1 and potentiometer R2 together constitute a torque detector circuit for motor M. When the load torque applied to the motor M exceeds a predetermined value, causing the current flowing through the fixed resistor R1 to exceed a predetermined value, the transistor Tr1 is rendered non-conductive, and the potential at the input terminal $\bar{R}$ of the R-S flip-flop circuit FF changes from a high to a low level. It will be noted that potentiometer R2 is adjustable for the purpose of selecting the threshold of the torque detector circuit.

An npn transistor Tr4 serves as a switch for permitting power to be supplied therethrough to the R-S flip-flop circuit FF and to the torque detector circuit for motor M. One terminal of push-button switch S3 is connected with the positive terminal of the power source E through a resistor R7 and the other terminal with the base of the transistor Tr4. Closing of the push-button switch S3 renders the transistor Tr4 conductive to permit power to be supplied to the R-S flip-flop circuit FF and to the torque detector circuit. A switch S4 is connected between the emitter and collector of the transistor Tr4. The point of connection between the fixed resistor R7 and the push-button switch S3 is connected with the base of the pnp transistor Tr3 through switching diode D1, S-C mode selection switch S5 and fixed resistor R8. The portion of the FIG. 6 circuit which is encircled by a dot-and-dash line forms a well-known electric shutter circuit EE having a Schmitt trigger circuit applied therein, the shutter circuit being accommodated within a camera body (not shown).

In a conventional manner power switch S7 is closed for supplying power to circuit EE after shutter release is initiated but just before opening of the shutter blade. The circuit includes an electromagnet Mg for holding a shutter closing member (not shown), and a shutter opening-closing signal is obtained from one end of the electromagnet Mg and is applied to the input terminal $\bar{S}$ of the R-S flip-flop FF by conductor K.

Operation of the second embodiment will now be described. (A) Single-Frame Shot

First, the S-C mode-selection switch S5 is closed. Then, to initiate the photographic process, the push-button switch S3 is closed, permitting a base current to flow through the fixed resistor R7 to the transistor Tr4, which is thereby turned on. Through transistor Tr4 power is supplied from the source E to the R-S flip-flop circuit FF and to the torque detector circuit. In this connection, the output terminals $\bar{Q}$ and Q of the R-S flip-flop circuit FF will provide a high level and a low level of potential, respectively, due to the action of the capacitor C. Furthermore, because the low level signal Q is applied to one of the inputs of AND gate A, the output terminal of the AND gate circuit A also provides a low level of potential. As a result, the pnp transistor Tr2 is turned off while the transistor Tr3 is turned on and the contacts S1 and S2 of the relays Re1 and Re2 are connected with S1a and S2b, whereupon the motor M starts its reverse revolution. The gear 5 of the reduction gear train then begins to rotate in the direction of the broken-line arrow. The film advance coupling member 15 is limited to the shown position by a limit member (not shown) in the camera body. Reverse rotation of shaft 14 moves the shaft away from cam 14a without transmitting the reverse rotation to the film advance and shutter charge shaft in the camera body. On the other hand, the pin 5a on the gear 5 causes pivotal movement of the shutter release lever 11 in counter-clockwise direction, which lifts the shutter release plunger 13 in the direction of the adjacent broken-line arrow (i.e. upwardly) to release the shutter in the camera body.

In the release of the shutter, the switch S7 (FIG. 6) is closed by a mechanism in the camera body after commencement of shutter release but just before opening of the shutter blade, to thereby permit a flow of current to the electromagnet Mg in the electric shutter circuit EE. Under these circumstances the shutter opening-closing signal assumes a low level of potential, and that potential is coupled to the input terminal $\overline{S}$ of the flip-flop circuit FF by conductor K. The input terminals $\overline{R}$ and $\overline{S}$ of the R-S flip-flop circuit FF being coupled to high and low levels of potential, respectively, the output terminals $\overline{Q}$ and Q provide a low level and a high level of potential, respectively. Accordingly, the transistor Tr2 conducts. As for the AND gate circuit A, the inputs thereof are at a low level and a high level so that the output thereof provides a low level of potential which maintains the transistor Tr3 conductive. Thus, both transistors Tr2 and Tr3 are rendered conductive, and the motor M is stopped from revolving.

Figure 5B:
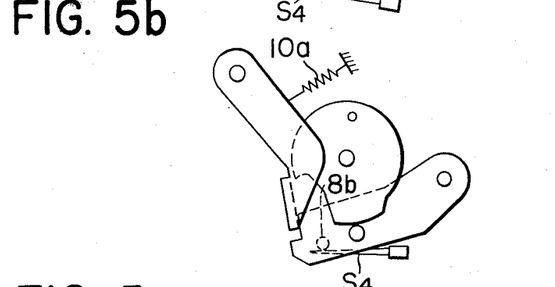

Before the closing of the push-button switch S3, the relative positions as shown in FIG. 5a are assumed by the cam 7, the switch lever 8, the retaining lever 10 and the switch S4, this last-named switch being open. However, as the shaft 6 rotates in the direction of broken-line arrow adjacent gear 5 in FIG. 4, the pin 9 rides on to the ramp surface of the cam 7 and thereby causes the switch lever 8 to rotate counter-clockwise about the pivot 8a against the force of a spring (not shown), until the switch S4 is closed by the pin 8b (FIG. 5b). Also, the retaining lever 10, which is spring-biased for counter-clockwise rotation, has its end received into the notch in the switch lever 8 (FIG. 5b).

Subsequently, the push-button switch S3 is opened by the camera operator. The opening of switch S3 turns off the transistor Tr4, but this does not cut off the power supply to the R-S flip-flop FF and to the torque detector circuit for motor M because the switch S4 remains closed. After a predetermined time of exposure has passed, as determined by the electric shutter circuit EE, no current flows to the electromagnet Mg and the magnet is de-energized, closing the shutter. The shutter opening-closing signal then assumes a high level of potential which is applied to the input terminal S of the R-S flip-flop FF by conductor K. Since the input terminal $\overline{R}$ remains at a high level of potential, the output terminals $\overline{Q}$ and Q remain at a low level and a high level of potential, respectively. As for the AND gate circuit A, the input terminals thereof are both at a high level, resulting in a high level of potential at the output terminal. Consequently, the pnp transistor Tr3 turns off and, transistor Tr2 remaining on, the motor M starts forward revolution. However, if the push-button switch S3 remains closed with the shutter closed, a base current for transistor Tr3 will flow by way of fixed resistor R8, S-C mode selection switch S5, diode D1, push-button switch S3, and npn transistor Tr4, ensuring that the transistor Tr3 will remain conductive. As contact S2 of the relay Re2 is still connected with S2b, the motor M remains de-energized. In other words, non-conduction of the transistor Tr3 and the resulting forward revolution of the motor M can occur only when two conditions, i.e., opening of the push-button switch S3 and closing of the shutter, have been attained.

Figure 5C:
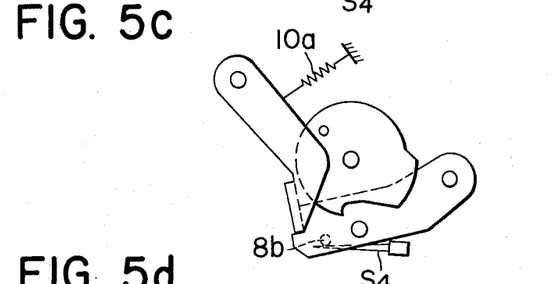

Thereupon, the gear 5 of the reduction gear train is rotated in the direction of the adjacent solid-line arrow (counter-clockwise direction). In the initial stage of such rotation the pin 5a releases the lever 11 to permit descent of the plunger 13 and return of the release member to the original position in the camera body. Since the switch lever 8 is being retained by the retaining lever 10 in the manner as shown in FIG. 5b, the switch S4 remains closed without the pin 9 being received in the recessed portion of the cam 7 (FIG. 5c). The motor M continues to revolve and the drive pin 14 which is secured to the gear 5 strikes against the drive cam 14a to rotate the cam in the direction of the adjacent arrow, whereby the film advance coupling 15 is rotated, thereby rotating the film advance and shutter charge shaft and effecting film advance and shutter charge.

When the film advance has been completed, the film advance and shutter charge shaft is unable to rotate further, thereby increasing the torque applied to the film advance coupling 15. This increases the load applied to the rotary shaft of the motor M, with a result that the current flowing through the motor M is sharply increased. This in turn increases the voltage drop provided by the fixed resistor R1 forming part of the torque detector circuit for motor M, whereby the transistor Tr1 is turned off. As a result, the input terminal $\overline{R}$ of the R-S flip-flop circuit FF assumes a low level of potential. In other words, the output terminals $\overline{Q}$ and Q of the flip-flop FF provide a high level and a low level of potential, respectively, turning off transistor Tr2. The output terminal of the AND gate circuit A also provides a low level of potential, turning on the transistor Tr3, whereby the motor M starts reverse revolution. Consequently, the gear 5 is rotated in the direction of the adjacent broken-line arrow to cause the drive pin 14 to release the drive cam 14a gradually, so that the drive cam 14a is permitted to rotate in the opposite direction with the aid of a return spring (not shown) in the camera body, thereby returning the shutter charge member in the camera body to its original position (lever return cycle). During the lever return cycle, film movement is not effected, because of the conventional one-way coupling (not shown).

Figure 5D:
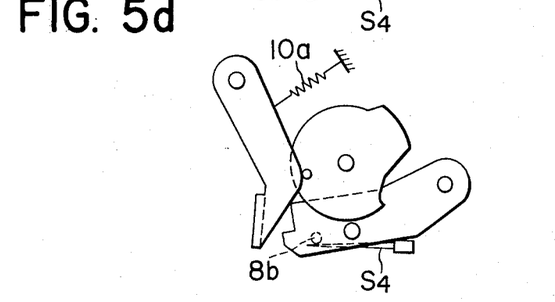

As for the switch lever 8, this lever tends to rotate clockwise during the above-described film advance cycle because the retaining lever 10 is engaged by the pin 7a and rotated clockwise to release the switch lever 8 from retention, as shown in FIG. 5d. However, as shown in that figure, the pin 9 engages the cam 7 so that the switch S4 remains closed. Subsequently, the film advance is completed, the gear 5 is rotated in the direction of the adjacent broken-line arrow, and the shutter charge member in the camera body returns to its original position, whereupon the pin 9 is received into the recessed portion of the cam 7 to open the switch S4 (FIG. 5a).

Since the npn transistor Tr4 has already turned off, the opening of the switch S4 cuts off the power supply to the R-S flip-flop circuit FF, thus turning off both transistors Tr2 and Tr3 and thus de-energizing the motor M.

Thus, the operation for a single-frame shot has been completed. (B) Continuous Shots First, the S-C mode selection switch S5 is opened. This cuts off the path for the base current of the transistor Tr3 which is provided by the circuit of fixed resistor R8, S-C mode selection switch S5, diode D1, push-button switch S3, and transistor Tr4. Therefore, when the shutter is closed after shutter release, the transistor Tr3 turns on without the need for the push-button switch S3 to be opened, whereby the motor M effects forward revolution to enter into a film advance cycle. If the push-button switch S3 is maintained in closed position, the gear 5 will rotate to its original position in the direction of the adjacent broken-line arrow after completion of the film advance, thus causing the pin 9 to be received into the recessed portion of the cam 7 to thereby open switch S4. However, because switch S3 remains closed, the transistor Tr4 remains conductive after the switch S4 has opened and continues to supply power to the flip-flop circuit and torque detector. Because of this, the motor repeats the above-described operation without being de-energized.

A third embodiment of the present invention will be described hereinafter with reference to FIGS. 7, 8 and 5.

Figures 7, 8:
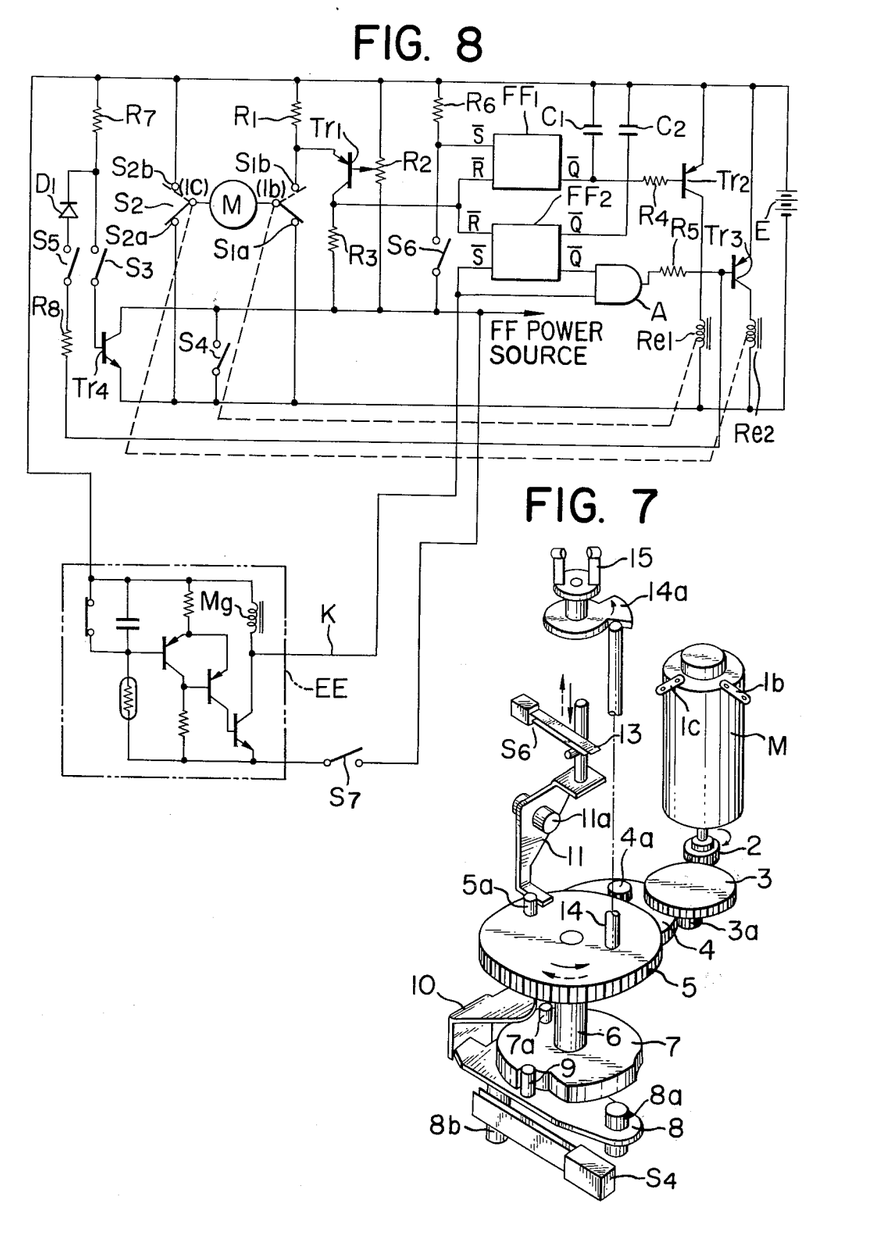
FIG. 7 is a perspective view showing a mechanism employed in a third embodiment of the present invention.
FIG. 8 is a diagram of an electric circuit employed in the third embodiment of the present invention.

In FIG. 7, switch S6 is adapted to close when the shutter release plunger 13 has lifted for shutter release and to open when the plunger 13 has lowered to its original position after closing of the shutter. The arrangement shown in FIG. 7 is identical in the other respects to the above-described second embodiment.

Referring to FIG. 8, there are two R-S flip-flop circuits FF1 and FF2 which are both similar to the flip-flop FF in the second embodiment. The input terminals $\bar{R}$ of the two R-S flip-flop circuits are connected with the collector of pnp transistor Tr1 forming part of the torque detector circuit for motor M. The input terminal $\bar{S}$ of the flip-flop FF1 is connected with the negative power source terminal through switch S6 and the input terminal $\bar{S}$ of the other flip-flop, FF2, is connected to electric shutter circuit EE through shutter opening-closing signal conductor K. The output terminals $\bar{Q}$ of these flip-flop circuits are connected with the positive terminal of the power source E through capacitors C1 and C2. These capacitors C1 and C2 are designed such that when the flip-flop circuits FF1 and FF2 are initially supplied with power their respective output terminals $\bar{Q}$ provide a high level of potential. The output terminal Q of the flip-flop FF2 provides a low level of potential. The base of transistor Tr2 is connected with the output terminal $\bar{Q}$ of the flip-flop FF1 through fixed resistor R4, and the base of pnp transistor Tr3 is connected with the output terminal of AND gate circuit A through fixed resistor R5. The circuit arrangement in the present embodiment is similar in other respects to that of the second embodiment.

Operation of the third embodiment will now be explained.

A. Single-Frame Shot

First, the S-C mode selection switch S5 is closed. As in the second embodiment, when switch S3 is closed, the npn transistor Tr4 conducts to permit power to be supplied to the torque detector circuit and to the flip-flop circuits FF1 and FF2. With the aid of the capacitors C1 and C2, the output terminals $\bar{Q}$ of the R-S flip-flops FF1 and FF2 provide a high level of potential and the output terminal Q of the flip-flop FF2 provides a low level of potential. The output terminal of the AND gate circuit A also provides a low level of potential. As a result, the transistor Tr2 is turned off and the transistor Tr3 is turned on, whereby the motor M begins reverse revolution. Then, the shutter release plunger 13 effects shutter release. At the final stage of the shutter release the switch S6 is closed by the plunger 13. This closing of the switch S6 brings the input terminal $\bar{S}$ of the flip-flop circuit FF1 to a low level of potential, and consequently the output terminal $\bar{Q}$ changes to a low level of potential. That is, the transistor Tr2 conducts and energizes the relay Re1, shifting the contact S1 thereof from S1a to S1b. The other relay contact, S2, remains engaged with S2b as described previously, thus effectively short-circuiting and de-energizing the motor M.

When the shutter is closed after the lapse of a period of time determined by shutter ciurcuit EE, the shutter opening-closing signal assumes a high level of potential which is coupled to terminal $\bar{S}$ of flip-flop FF2 by the conductor K. The input terminal $\bar{R}$ remains at a high level of potential, so that the flip-flop circuit FF2 maintains the same condition as before (i.e. $\bar{Q}$ at a low level and Q at a high level). As a result, the output of the AND gate circuit A provides a high level to turn off the transistor Tr3, which in turn shifts the relay contact S2 to S2a to cause forward revolution of the motor M, thus causing the shutter release plunger 13 to move in the direction of the adjacent solid-line arrow and open the switch S6. This opening of the switch S6 causes the input terminal $\bar{S}$ of the R-S flip-flop FF1 to assume a high level of potential. Because the other input terminal $\bar{R}$ is also at a high level of potential, the output terminal $\bar{Q}$ maintains the same condition as before (i.e. low level) and the motor M therefore continues its forward revolution.

When the film advance has completed, the torque detector circuit for the motor produces a low level potential signal which is coupled to the input terminals $\bar{R}$ of the R-S flip-flops FF1 and FF2. As a result, the output terminal $\bar{Q}$ of the flip-flop FF1 provides a high level of potential and the output terminal Q of the flip-flop FF2 provides a low level of potential, whereby the motor again revolves in reverse (lever return cycle). When the shutter charge member returns to its original position, all operations are stopped. During the cycle described hitherto, the switch S4 performs the same function as that described with respect to the second embodiment.

B. Continuous Shots

The operation in this case is similar to that described with respect to single-frame shots, but with continuous operation, similar to the second embodiment, as long as S3 is closed.

The following differences between the operation of the second and third embodiments are noteworthy. In the second embodiment, the switch S7 was closed after commencement of shutter release but just before opening of the shutter blade. Thereby, the input terminal $\bar{S}$ of the flip-flop circuit FF assumed a low level but the other input terminal $\bar{R}$ remained at a high level, so that the output terminal $\bar{Q}$ provided a low level of potential to turn on the transistor Tr2. On the other hand, the output terminal Q provided a high level, so that the output of the AND gate circuit remained at a low level to maintain the transistor Tr3 on. Consequently, both relays Re1 and Re2 were energized to connect their contacts S1 and S2 with S1b and S2b, respectively, thus de-energizing the motor M. Thus, in the second embodiment, the motor was stopped only after closing of the switch S7.

In the third embodiment, the switch S6 is closed at the final stage of the shutter release cycle, whereupon the input terminal $\bar{S}$ of the flip-flop FF1 assumes a low level of potential and the output terminal $\bar{Q}$ provides a low level, thereby turning on the transistor Tr2. Since transistor Tr3 is already on, the motor is de-energized. When the switch S7 is closed after commencement of shutter release but just before opening of the shutter blade to permit a flow of current to the electromagnet Mg, the input terminal $\bar{S}$ of the flip-flop FF2 assumes a low level of potential but the output terminal Q provides a high level of potential and the output of the AND gate circuit A remains at a low level. Consequently, the transistor Tr3 remains conductive and the motor remains de-energized. In the third embodiment, the conduction of the transistor Tr2 precedes the closing of the switch S7 and the condition of the transistor Tr2 remains unchanged even after the switch S7 is closed. Thus, in the third embodiment, the motor M is de-energized before the closing of the switch S7. This is the significant difference between the operation of the third embodiment and the operation of the second embodiment.

The described embodiments of the present invention illustrate motor drive systems for cameras of the type which require reciprocative movement of the shutter charge member. Moreover, the mechanism involved therein can be very simple. Most of the system can be implemented by an electric circuit, permitting the employment of integrated circuits and the like, which contribute to a greatly reduced size of the entire construction. In addition, various cycles of operation can be made to occur sequentially to eliminate any malfunction or difficulty (such as the occurrence of film advance prior to shutter closing) which would otherwise be caused by the interference between successive cycles.

While the preferred embodiments of the invention have been shown and described, it will be apparent to those skilled in the art that changes can be made in these embodiments without departing from the principles and spirit of the invention, the scope of which is defined in the appended claims.

The invention claimed is:

1. A motor drive system for a camera, comprising a reversible electric motor, a drive shaft for film advancement, means responsive to operation of said motor in one direction for turning said shaft from an initial position in a direction to advance film in said camera and responsive to subsequent operation of said motor in the opposite direction for turning said shaft back to said initial position, means for energizing said motor to operate in said one direction, and motor torque responsive means including means for detecting the current drawn by said motor for sensing when said film has been advanced to a predetermined extent and for thereupon energizing said motor to operate in said opposite direction.

2. A motor drive system in accordance with claim 1, further comprising means for releasing the shutter of said camera, and shutter releasing means including means for energizing said motor to operate in said opposite direction prior to operation in said one direction.

3. In a motor drive system for a camera having a shutter charge member, shutter release means, and drive shaft means rotatable in one direction to effect film advance and to move said shutter charge member to charge the shutter and rotatable in the reverse direction to a fixed position to return the shutter charge member to its original position so that the shutter may be released after completion of the film advance and shutter charge, the improvement comprising:
   a. a reversible electric motor,
   b. means for transmitting the forward or reverse revolutions of the motor to the drive shaft means to rotate said shaft means in said one direction or said reverse direction, respectively,
   c. means for sensing when film has been advanced to a predetermined extent and for thereupon producing a signal, and
   d. control circuit means for controlling the motor in order to rotate said drive shaft means in said one direction after shutter release, thus effecting film advance and shutter charge, and to rotate said drive shaft means in the reverse direction in response to said signal and thus return said drive shaft means to said fixed position.

4. A motor drive system according to claim 3, wherein the control circuit means includes flip-flop circuit means and relay means responsive to the operation of the flip-flop circuit means for controlling the connection of the motor to a source of electric power.

5. A motor drive system according to claim 4, wherein the flip-flop circuit means comprises a flip-flop circuit having a pair of outputs, and wherein the relay means comprises a pair of relays for controlling the connection of opposite terminals of said motor to either of opposite terminals of the source of power, means for controlling the energization of one of the relays from one of the outputs of the flip-flop circuit, and AND gate means for controlling the energization of the other relay in response to the other of the outputs of the flip-flop circuit and a corresponding input of the flip-flop circuit.

6. A motor drive system according to claim 4, wherein said flip-flop circuit means comprises a pair of flip-flop circuits and wherein said relay means comprises a pair of relays for controlling the connection of opposite terminals of said motor to either of opposite terminals of said source of power, means for controlling the energization on one of said relays from an output of one of said flip-flop circuits, and AND gate means for controlling the energization of the other relay in response to an output of the other flip-flop circuit and a corresponding input of that circuit.

7. A motor drive system according to claim 4, wherein said flip-flop circuit means has means for setting its initial condition upon the application of power thereto.

8. A motor drive system according to claim 4, wherein said sensing means comprises means for detecting the current drawn by said motor and for applying a signal to said flip-flop circuit means.

9. A motor drive system according to claim 4, wherein said control circuit means includes means synchronized with the shutter release means for applying a signal to the flip-flop means in order to energize said motor to rotate said drive shaft means in said one direction.

* * * * *